F. SPURR.
CIRCULAR MEAT SAW.
APPLICATION FILED AUG. 6, 1915.
1,183,134.
Patented May 16, 1916.
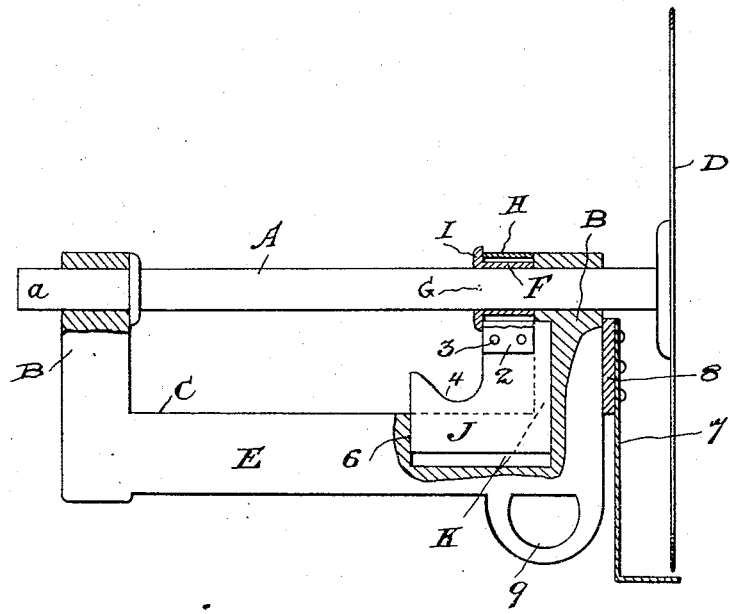
Inventor:
Frank Spurr
by Egerton R. Case
atty

UNITED STATES PATENT OFFICE.

FRANK SPURR, OF PETROLEA, ONTARIO, CANADA.

CIRCULAR MEAT-SAW.

1,183,134.  Specification of Letters Patent.  Patented May 16, 1916.

Application filed August 6, 1915. Serial No. 44,046.

*To all whom it may concern:*

Be it known that I, FRANK SPURR, a subject of the King of Great Britain, of the town of Petrolea, county of Lambton, Province of Ontario, Dominion of Canada, have invented certain new and useful Improvements in Circular Meat-Saws, of which the following is a specification.

My invention relates to improvements in circular meat saws, and the object of my invention is to design a very compact meat saw which can be driven by any suitable means, and one which can be handled conveniently by butchers for the sawing of bones, thus saving considerable time and labor.

The preferred construction of my device will be hereinafter particularly set forth, and what I claim as new will be pointed out in the claims forming part of this specification.

The drawing shows a side elevation of my device, parts being shown in section to illustrate internal construction.

A is the saw shaft, and the same is suitably journaled in the ends B of the frame C.

D is any suitable circular meat saw suitably secured to the shaft A.

The frame C is provided with a hand grip E which is spaced apart from the saw shaft to permit the hand to grasp the said frame. Keyed to the shaft A by the set screw G, or any other suitable means, is a collar F, which performs the function of a brake shoe. Looped around the said collar is the brake band H which operates between the flange I of said collar and its opposing end B of the frame C.

J is the brake grip which is mounted in a slot K formed in the hand grip E at one end thereof and extending into the adjacent end B of the frame C. The ends 2 of the brake band H are secured by rivets 3 or other suitable fastening means to the brake grip J.

To apply the brake to the shaft A after the saw D has performed its function, one of the fingers of the hand is pressed into the groove 4, thus moving the brake grip J within the slot K away from the saw shaft A, thus jamming the brake band H against the collar or brake shoe F. The release of the pressure against the brake grip J will permit said grip, as well as the brake band H, to assume the position illustrated in the drawing out of contact with the collar or shoe F. The flange I of the collar or shoe F overhangs portion of the brake grip J to coöperate with the wall 6 of the hand grip E to retain the said brake grip in the slot K. Any suitable shield 7 is provided and the same is secured in place by any suitable shield support 8 carried by the frame C. 9 is an ear carried by the said handle to permit the saw to be hung up when not in use.

Any suitable means may be used to drive the shaft A, such as a flexible shaft (not shown), which is designed to be coupled to the end $a$ of the shaft A.

It will be observed from the drawing that there are no obstructions on the face of the saw to prevent it operating close to the meat. Furthermore the design of meat saw permits the same to enter the cut in the meat to reach the bone.

While I have described the preferred form of brake I use with my saw, I do not confine myself to necessarily using this form of brake, nor do I confine myself to all the details of construction shown in the drawings.

Though I prefer to use the brake shoe or collar F, still I do not confine myself to using the same.

What I claim as my invention is:

1. As a new article of manufacture, a circular meat saw comprising a frame composed of bearing ends and a hand grip, the said bearing ends projecting beyond one side of said hand grip; a saw shaft journaled in said frame and substantially in parallel relationship to said hand grip, from which it is spaced apart; a circular saw carried by said shaft and projecting beyond one end of said frame, the hand grip of which is provided with a slot; a brake shoe secured to said shaft; a brake band positioned around said shoe, and a brake grip, operating in said slot, to which the ends of said brake band are secured.

2. As a new article of manufacture, a circular meat saw comprising a frame provided with a hand grip formed with a slot; a saw shaft journaled in said frame; a circular saw carried by said shaft and projecting beyond one end of said frame; a brake shoe secured to said saw shaft, and provided with a flange extending radially beyond said saw shaft; a brake band positioned around said shoe, and a brake grip operating in the slot formed in said hand grip to which the ends of said brake band are secured, as set forth.

In testimony whereof I have affixed my signature.

FRANK SPURR.

Witness:
G. G. MONCRIEFF.

Copies of this patent may be obtained for five cents each, by addressing the "Commissioner of Patents, Washington, D. C."